(12) United States Patent
Brettell et al.

(10) Patent No.: US 7,757,111 B2
(45) Date of Patent: Jul. 13, 2010

(54) METHOD AND SYSTEM FOR INSURING DATA INTEGRITY IN ANTICIPATION OF A DISASTER

(75) Inventors: David A. Brettell, Vail, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 11/697,019

(22) Filed: Apr. 5, 2007

(65) Prior Publication Data

US 2008/0250214 A1   Oct. 9, 2008

(51) Int. Cl.
*G06F 11/00* (2006.01)
(52) U.S. Cl. .......................................................... 714/3
(58) Field of Classification Search ........................ 714/3
See application file for complete search history.

(56) References Cited

U.S. PATENT DOCUMENTS

| | | | |
|---|---|---|---|
| 6,144,999 A | 11/2000 | Khalidi et al. | |
| 6,477,667 B1* | 11/2002 | Levi et al. | 714/57 |
| 6,516,424 B2* | 2/2003 | Satomi et al. | 714/4 |
| 6,845,435 B2 | 1/2005 | Nagasawa et al. | |
| 6,981,177 B2 | 12/2005 | Beattie | |
| 7,080,277 B2 | 7/2006 | Anna et al. | |
| 7,093,086 B1 | 8/2006 | Van Rietschote | |
| 7,111,192 B2 | 9/2006 | Iguchi | |
| 7,325,161 B1* | 1/2008 | Rakic et al. | 714/15 |
| 2002/0163760 A1* | 11/2002 | Lindsey et al. | 360/134 |
| 2006/0149991 A1* | 7/2006 | Guzman et al. | 714/2 |
| 2006/0190775 A1* | 8/2006 | Aggarwal et al. | 714/100 |
| 2007/0168715 A1* | 7/2007 | Herz et al. | 714/13 |
| 2008/0148097 A1* | 6/2008 | Johnson | 714/6 |
| 2008/0209258 A1* | 8/2008 | Casale et al. | 714/4 |

* cited by examiner

*Primary Examiner*—Bryce P Bonzo
(74) *Attorney, Agent, or Firm*—Hamilton & Terrile, LLP; Stephen A. Terrile

(57) ABSTRACT

A preparation of a storage system of a pending disaster at an onsite location of the storage system involves the storage system receiving a disaster preparation initiation from an offsite client. In response to receiving the disaster preparation initiation from the offsite client, the storage system to executes disaster preparation of onsite data including managing a temporary storage of onsite data volumes to at least one peer site, managing a storage of onsite cached data to a first onsite removable media, and/or managing a storage of onsite management information to a second onsite removable media.

18 Claims, 7 Drawing Sheets

METHOD AND SYSTEM FOR INSURING DATA INTEGRITY IN ANTICIPATION OF A DISASTER

FIELD OF THE INVENTION

The present invention generally relates to a preparation of a storage system in anticipation of a disaster (e.g., a fire, a flood, a hurricane, etc). The present invention specifically relates to a preservation of data responsive to a disaster warning in a manner that insures data integrity in the recovery of the data after the disaster.

BACKGROUND OF THE INVENTION

In hierarchical virtual storage systems, intensively used and frequently accessed data is stored in fast but expensive memory. One example of a fast memory is a direct access storage device ("DASD"). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

One such hierarchical storage system is a virtual tape storage system ("VTS") including a host data interface, a DASD, and a number of tape devices. When the host writes a logical volume, or a file, to the VTS, the data is stored as a file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume is then appended onto a tape cartridge, or a physical volume, with the original left on the DASD for possible cache hits. When a DASD file has been appended to a tape cartridge and the original remains on the DASD, the file is "premigrated."

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

From time to time, a warning of a pending disaster may be issued for an onsite location of a storage system like a VTS. For example, an onsite location of a storage system may receive a warning of an approaching high severity hurricane, a warning of a fire growing in nearby areas, or a warning of a potential breach of a levy or a damn. The data storage industry is therefore continually striving to provide clients that are forewarned of a disaster with an ability to protect the data of the storage system in view of having an opportunity of 100% data recovery following the disaster.

SUMMARY OF THE INVENTION

In anticipation of an onsite disaster, a client that has been forewarned of the disaster is provided with an ability to protect the data of the storage system at the onsite location from an offsite location in view of having an opportunity of 100% data recovery following the disaster.

A first form is a computer readable medium embodying a program of machine-readable instructions executable by a processor to perform operations for preparing the storage system of a pending disaster at an onsite location of the storage system. The operations comprise the storage system receiving a disaster preparation initiation from an offsite client, and in response to receiving the disaster preparation initiation from the offsite client, the storage system executing a disaster preparation of onsite data including managing a temporary storage of onsite data volumes to at least one peer site, managing a storage of onsite cached data to a first onsite removable media, and/or managing a storage of onsite management information to a second onsite removable media.

A second form is a storage system comprising a processor, and a memory storing instructions operable with the processor for preparing the storage system for preparing the storage system of a pending disaster at an onsite location of the storage system. The instructions are executed for the storage system receiving a disaster preparation initiation from an offsite client, and in response to receiving the disaster preparation initiation from the offsite client, the storage system executing a disaster preparation of onsite data including managing a temporary storage of onsite data volumes to at least one peer site, managing a storage of onsite cached data to a first onsite removable media, and/or managing a storage of onsite management information to a second onsite removable media.

A third form is a method for preparing a storage system of a pending disaster at an onsite location of the storage system. The method comprises the storage system receiving a disaster preparation initiation from an offsite client, and in response to receiving the disaster preparation initiation from the offsite client, the storage system executing a disaster preparation of onsite data including managing a temporary storage of onsite data volumes to at least one peer site, managing a storage of onsite cached data to a first onsite removable media, and/or managing a storage of onsite management information to a second onsite removable media.

The aforementioned forms and additional forms as well as objects and advantages of the present invention will become further apparent from the following detailed description of the various embodiments read in conjunction with the accompanying drawings. The detailed description and drawings are merely illustrative rather than limiting, the scope of the present invention being defined by the appended claims and equivalents thereof.

DETAILED DESCRIPTION OF THE INVENTION

Figure 1:
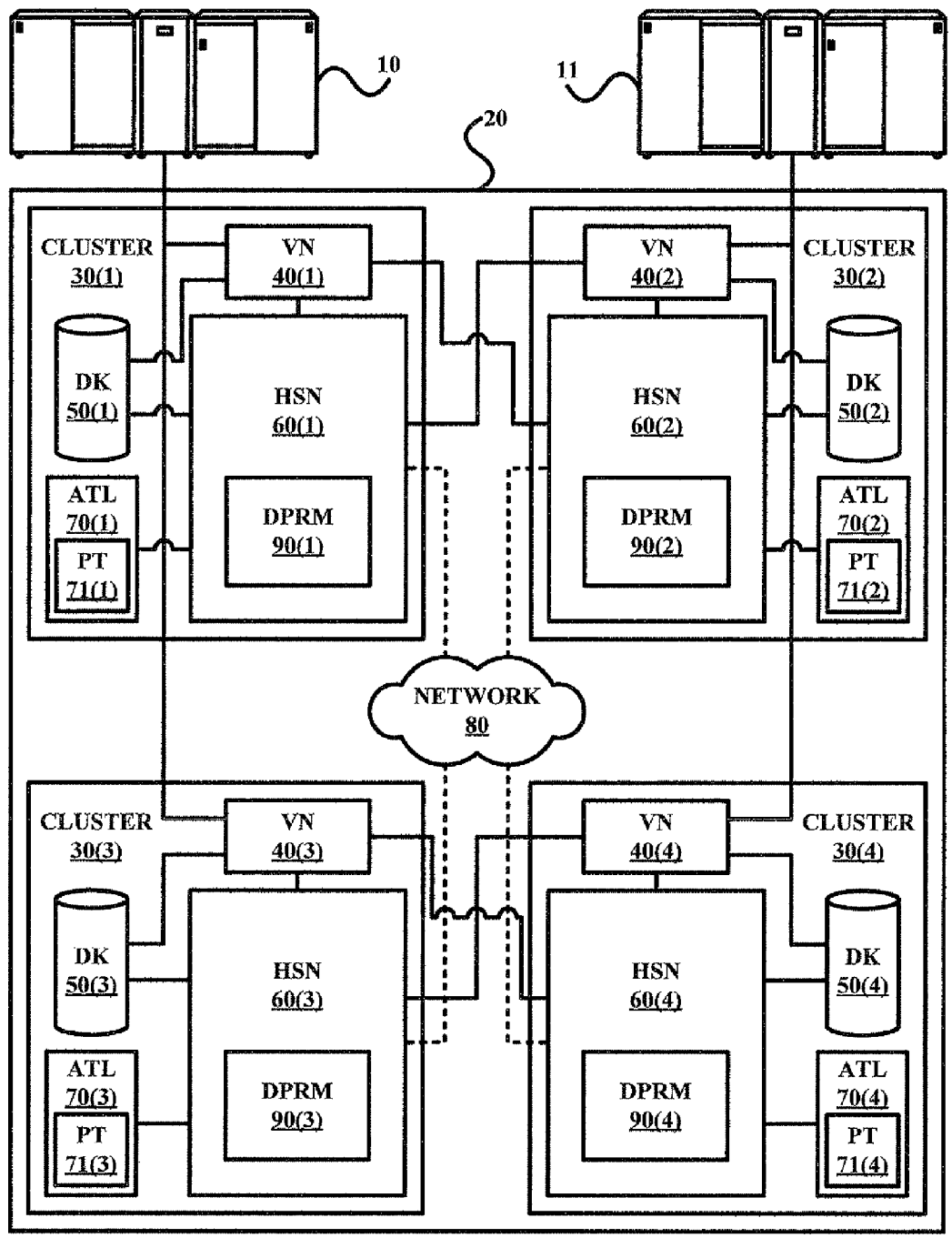
FIG. 1 illustrates a diagram of one embodiment of a storage domain in accordance with the present invention.

FIG. 1 illustrates a storage domain 20 for serving a pair of hosts 10 and 11. Storage domain 20 employs four (4) virtual tape server clusters 30 interconnected by a network 80 with each cluster 30 including a virtualization node ("VN") 40 and a disk ("DK") 50 for emulating a tape drive to hosts 10 and 11. Each cluster 30 further includes a hierarchical storage node ("HSN") 60 for locally moving data between disk 50 and an automated tape library ("ATL") 70 as well as remotely moving data between a local disk 50 and a remote disk 50.

Figure 2:
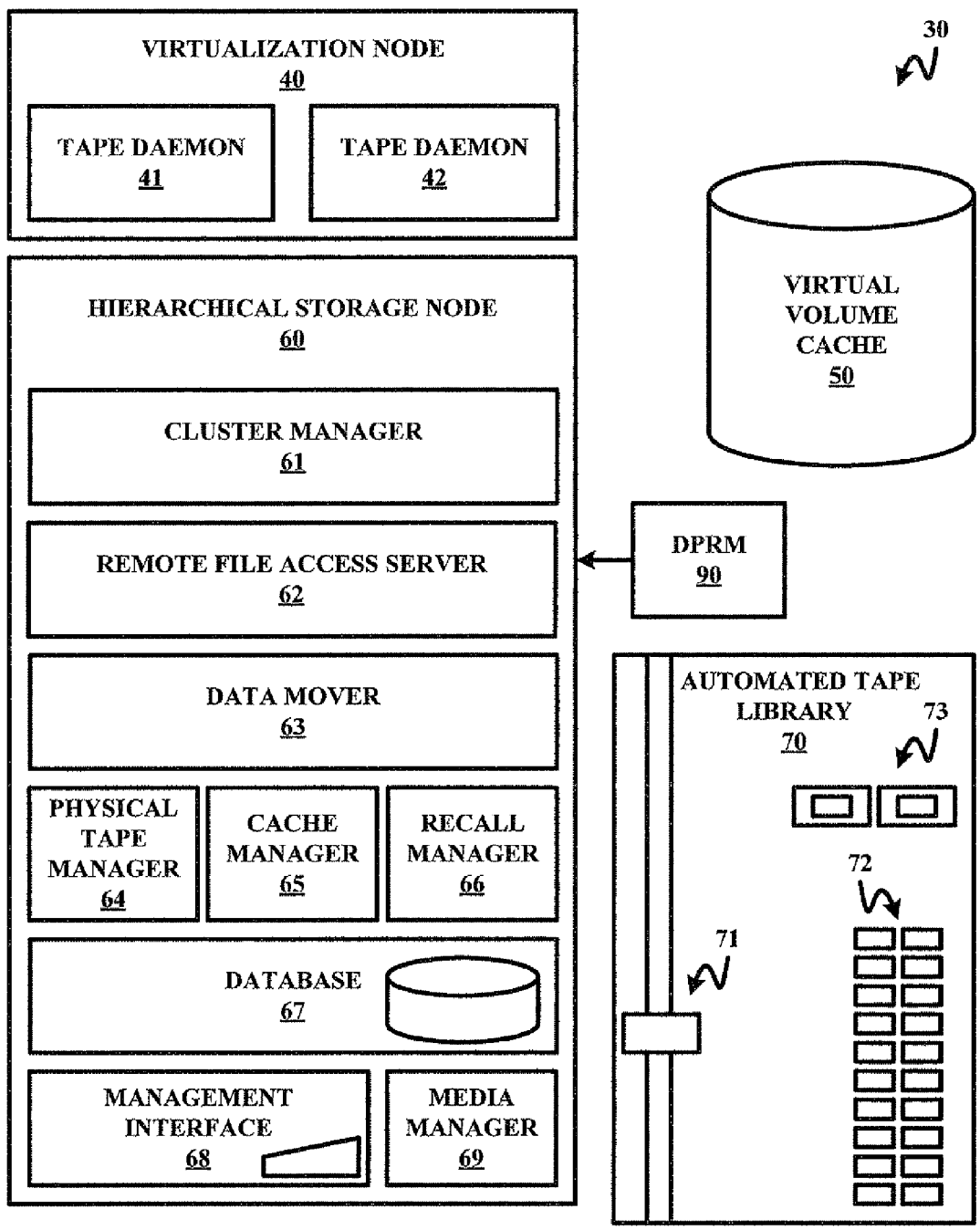
FIG. 2 illustrates a diagram of one embodiment of a virtual tape storage system in accordance with the present invention.

In one exemplarily embodiment, as shown in FIG. 2, disk 50 serves as a virtual volume cache containing virtual volumes for local and remote access thereto and library 70 includes a robotic accessor 71 for mounting physical tapes ("PT") 72 in physical tape drives 73 for access to physical volumes stored in physical tapes 72. To this end, virtualization node 40 employs a pair of tape daemons 41 and 42 for operating on virtual volume files residing in either local cache 50 or a remote cache 50 as directed by host 10 or host 11, and hierarchical storage node 60 employs a cluster manager 61, a remote file access server 62, a data mover 63, a physical tape manager 64, a cache manager 65, a recall manager 66, a database 67, a management interface 68 and a media manager 69.

Cluster manager 61 coordinates operations between clusters 30 via tokens that are stored in each cluster's database 67 to determine which cluster 30 has a current copy of data and coordinates copying of data between clusters 30. Remote file access server 62 provides a link to cache 50 by a remote cluster 30. Data mover 63 controls the actual data transfer operations for copies performed between clusters 30 and transfers of data between cache 50 and library 70.

Physical tape manager 64 manages physical tapes 72 in library 70 in multiple physical volume pools, controls reclamation, borrows/returns volumes from a scratch pool, and controls movement of physical tapes 72 between pools. Cache manager 65 controls a copying of data between cache 50 to library 70 and any subsequent removal of a redundant copy of data in cache 50, and provides control signals to balance data flow between cache 50 and other node 60 components. Recall manager 66 queues and controls recalls of data into cache 50 from library 70 on behalf of virtualization node 40 and cluster manager 61.

Management interface 68 provides information about VTS cluster 30 and allows a user control and configuration of cluster 30. Media manager 69 manages the handling of physical tapes 72 and error recovery, and diagnoses errors and determines if the errors were caused by a physical tape drive 73 of library 70 or a physical tape media 72 to thereby take appropriate action.

Referring to FIG. 1, storage domain 20 is premised on providing each cluster 30 with a disaster preparation/recovery module ("DPRM") 90 that is structurally constructed with hardware, software, firmware or any combination thereof to implement disaster preparation/recovery principles of storage domain 20. In one exemplarily embodiment as shown in FIG. 2, module 90 is installed within hierarchical storage node 60 as an executable program that can be called by and executed on the hierarchical storage node 60 as needed prior to an occurrence of a pending disaster of the onsite location of the corresponding cluster 30.

Figure 3:
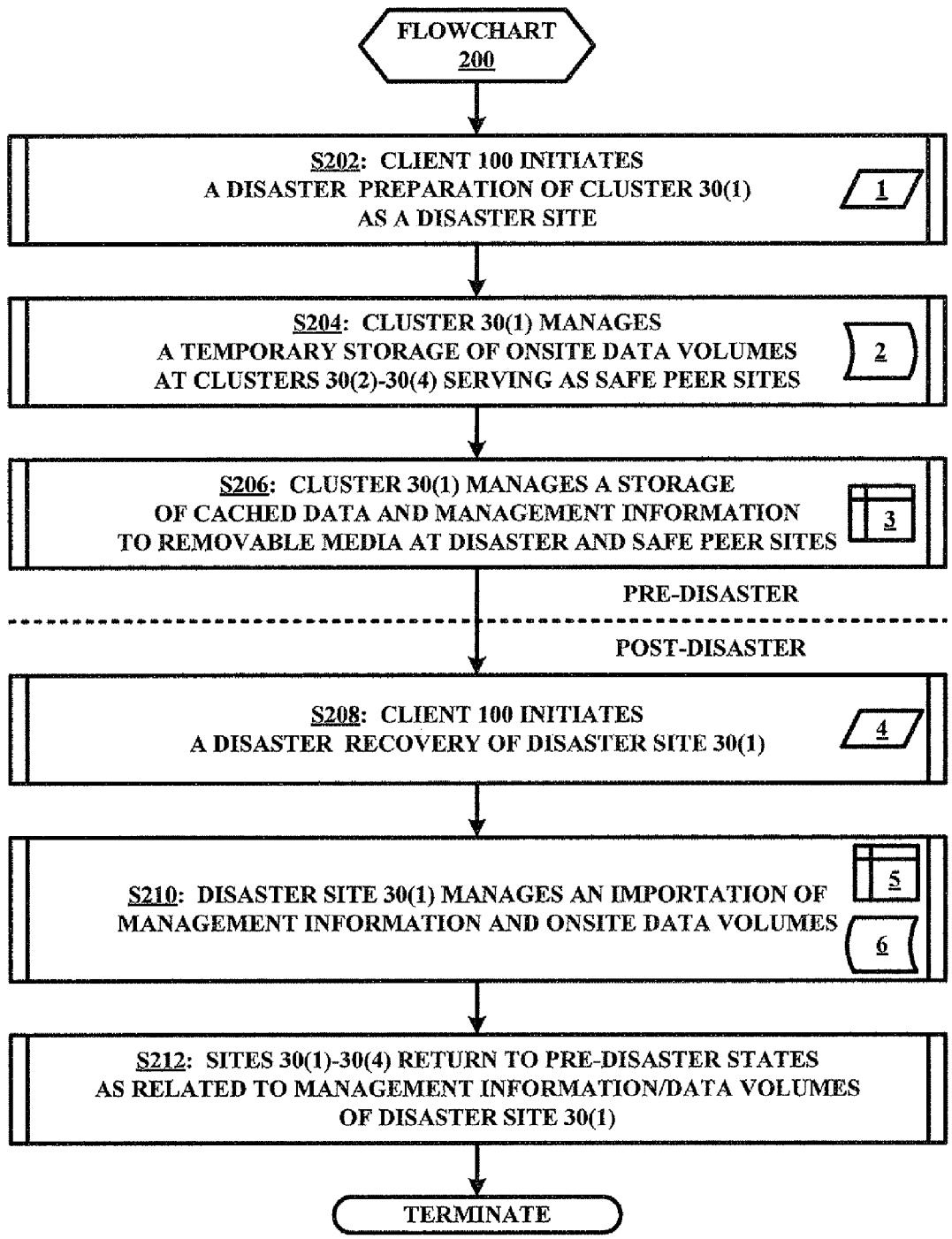
FIG. 3 illustrates a flowchart representative of one embodiment of a disaster preparation and recovery method in accordance with the present invention.
Figure 4:
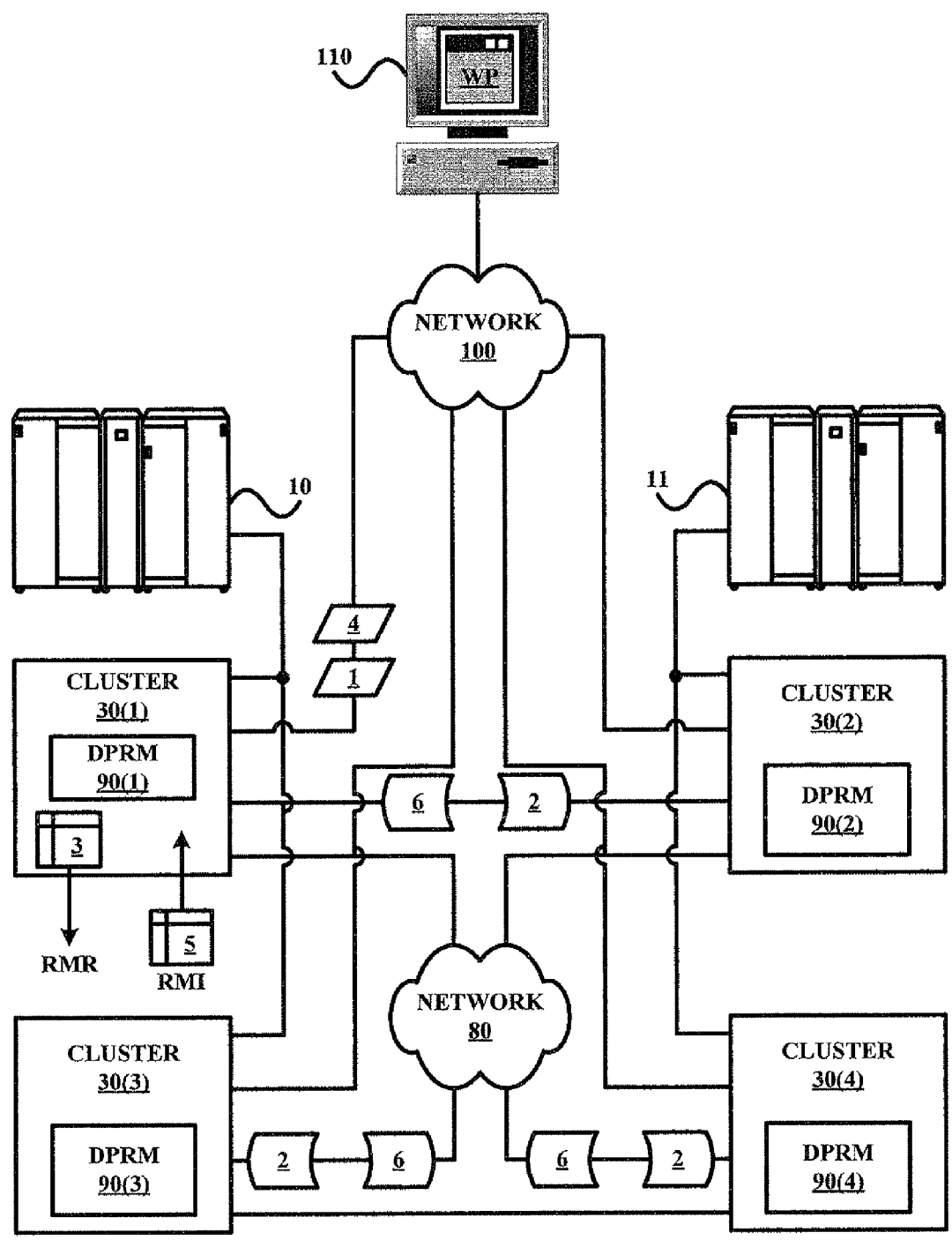
FIG. 4 illustrates a diagram of an exemplarily disaster preparation and recovery of the storage domain illustrated in FIG. 1 in accordance with the present invention.

FIG. 3 illustrates a flowchart 200 representative of a disaster preparation/recovery method embodying the inventive principles of storage domain 20 in the context of a pending disaster of cluster 30(1), and FIG. 4 illustrates a client 110 connected to each cluster 30 via a network 100 for purposes of facilitating an understanding a description of FIG. 3.

Referring to FIG. 3, in response to a warning of a pending disaster of cluster 30(1), a stage S202 of flowchart 200 encompasses client 110 initiating a disaster preparation of cluster 30(1) as a disaster site. In one exemplarily embodiment of stage S202 as shown in FIG. 4, client 110 accesses a web page WP provided by a web server (not shown) of module 90(1) whereby client 110 selects a "Disaster Ready" button (not shown) of web page WP to thereby initiate a disaster preparation of disaster site 30(1) as shown in FIG. 4.

A stage S204 of flowchart 200 encompasses disaster site 30(1) managing a temporary storage of onsite data volumes at clusters 30(2)-30(4) serving as safe peer sites. In one exemplarily embodiment of stage S204, module 90(1) marks the onsite data volumes exclusive to disaster site 30(1) with a unique identifier for purposes of distinguishing the marked data volumes from other data volumes within the domain, and participates with modules 90(2)-90(4) in a replication of each marked data volume to one of the safe peer sites 30(2)-30(4) as shown in FIG. 4.

A stage S206 of flowchart 200 encompasses disaster site 30(1) managing a storage of cached data and management information to removable media at disaster site 30(1) and safe peer sites 30(2)-30(4). In one exemplarily embodiment of stage S206, module 90(1) migrates all cached data to onsite removable media at disaster site 30(1), writes management information in the form of data location information indicative of the location of each replicated and marked data volume to onsite removable media at disaster site 30(1), offloads management information in the form of database content and metadata content to onsite removable media at disaster site 30(1), and places the removable media storing management information in an onsite I/O station for purposes of such removable media being removed from disaster site 30(1) (e.g., RMR shown in FIG. 4). Optionally, module 90(1) participates with one or more modules 90(2)-90(4) in a replication of the management information and cached data to one or more of the safe peer sites 30(2)-30(4).

Stages S204 and S206 are performed during a pre-disaster phase of the pending disaster to the maximum extent possible in view of the nature of the pending disaster. For example, in view of a small time window for disaster preparation, stage S204 may be omitted or partially executed in view of facilitating an execution of stage S206 to the maximum extent possible or conversely, stage S206 may be omitted or partially executed in view of facilitating an execution of stage S204 to the maximum extent possible.

Stages S208-S212 of flowchart 200 is executed during a post-disaster phase of the pending disaster or threat thereof. Prior to an execution of stages S208-212, hardware at disaster site 30(1) is replaced and/or repaired as needed based on any damage sustained by disaster 30(1) during the disaster or threat thereof. Furthermore, connections to safe peer sites 30(2)-30(4) are also replaced and/or repaired as needed.

Upon the onsite hardware and site connections being fully operational, stage S208 encompasses client 110 initiating a disaster recovery of cluster 30(1) as the disaster site. In one exemplarily embodiment of stage S208 as shown in FIG. 4, client 110 accesses a web page WP provided by a web server (not shown) of module 90(1) whereby client 110 selects a "Disaster Recovery" button (not shown) of web page WP to thereby initiate the disaster recovery of disaster site 30(1) as shown in FIG. 4

Stage S210 encompasses disaster site 30(1) managing an importation of the management information as stored on the removed removable media and onsite data volumes as temporarily stored on safe peer sites 30(2)-30(4). In one exemplarily embodiment, module 90(1) imports onsite removable media placed in the onsite I/O station of disaster site 30(1) as shown as RMI in FIG. 4. Furthermore, as needed, module 90(1) imports the onsite data volumes via offsite removable media from safe peer sites 30(2)-30(4) placed in the onsite I/O station of disaster site 30(1) and/or via a replication of the onsite data volumes from safe peer sites 30(2)-30(4).

Stage S212 encompasses clusters 30(2)-30(4) returning to pre-disaster states as related to the management information/data volumes of disaster site 30(1). In one exemplary embodiment of stage S212, module 90(1) utilizes the management information to ensure all of the data volumes stored on disaster site 30(1) pre-disaster are stored on disaster site 30(1) post-disaster, and modules 90(2)-90(4) removes all marked management information and data volumes of disaster site 30(1) from peer sites 30(2)-30(4)

In practice, storage domain 20 does not impose any restrictions or any limitations to the structural configurations of modules 90 for implementing the disaster preparation/recovery principles of storage domain 20 as embodied by flowchart 200. Nonetheless, to further facilitate an understanding of flowchart 200, a description of FIGS. 5-7 illustrate flowcharts 220-250 is provided herein as an exemplarily representation of an implementation of flowchart 200 by modules 90 in view of cluster 30(1) receiving a warning of a pending disaster at its onsite location.

Figure 5:
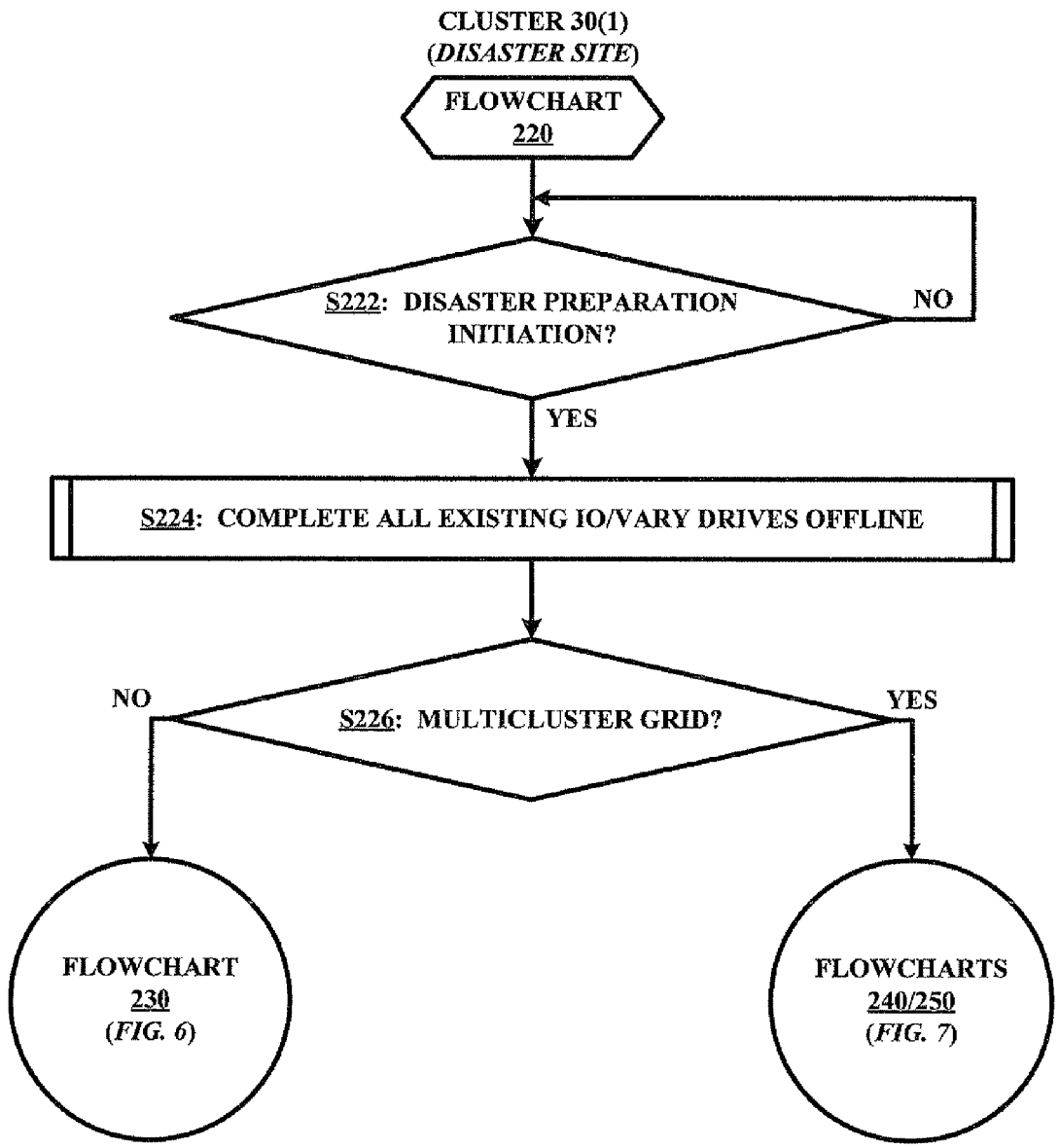
FIGS. 5-7 illustrate flowchart representative of an exemplary pre-disaster embodiment in accordance with the present invention of the disaster preparation and recovery method illustrated in FIG. 3.

Referring to FIGS. 4 and 5, a stage S222 of flowchart 200 encompasses module 90(1) remaining in a passive state until a receipt of a disaster preparation initiation from client 110. In response thereto, during a stage S224 of flowchart 200, module 90(1) completes all existing I/O with hosts 10 and 11 and varies its drives offline.

Figure 6:
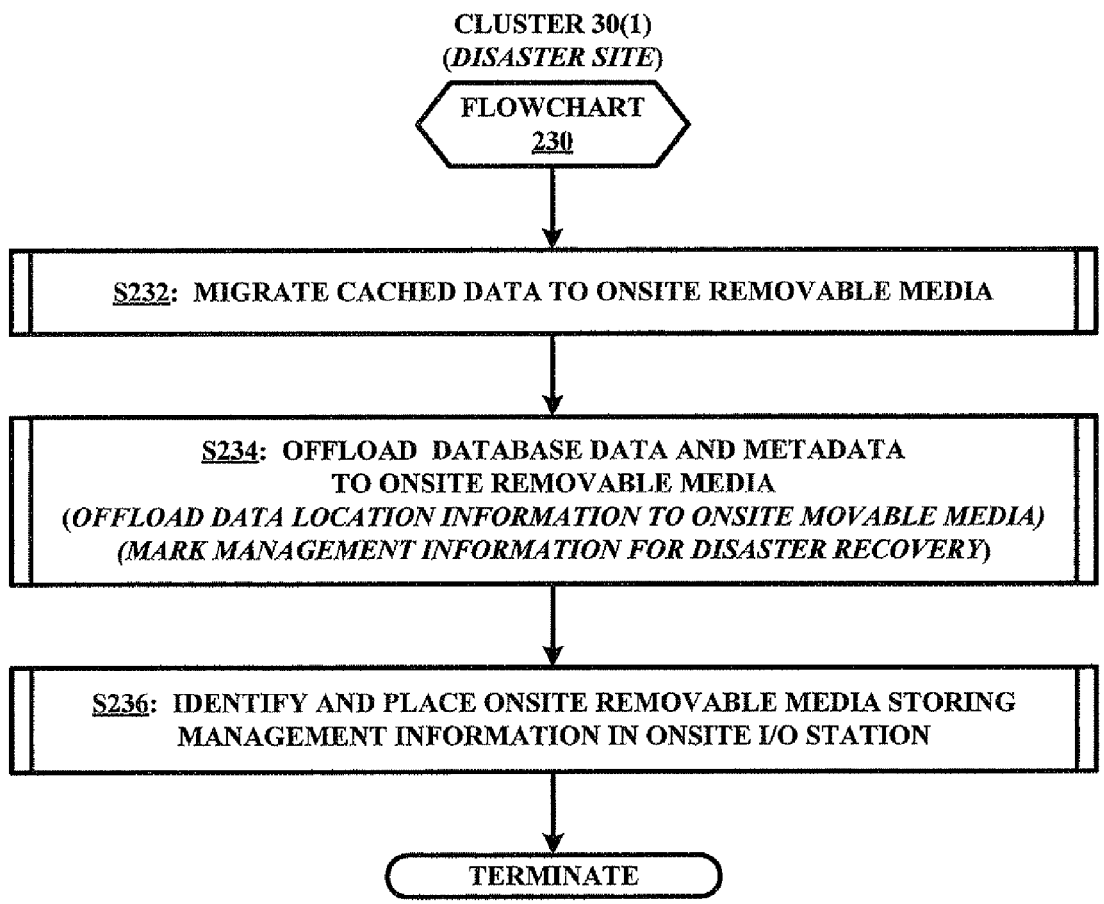

If module 90(1) was not situated in a multi-cluster grid as shown in FIG. 5, then module 90(1) would proceed to flowchart 230 as shown in FIG. 6. A stage S232 of flowchart 230 would encompass module 90(1) migrating all cached data to onsite removable media, and a stage S234 of flowchart 230 would encompass module 90(1) writing database data and metadata to onsite removable media. Thereafter, during a stage S236 of flowchart 200, module 90(1) would identify all onsite removable media storing management information in the form of the database data and the metadata and place the identified removable media in an onsite I/O station for purposes of facilitating a removal of the management information prior to the disaster.

Figure 7:
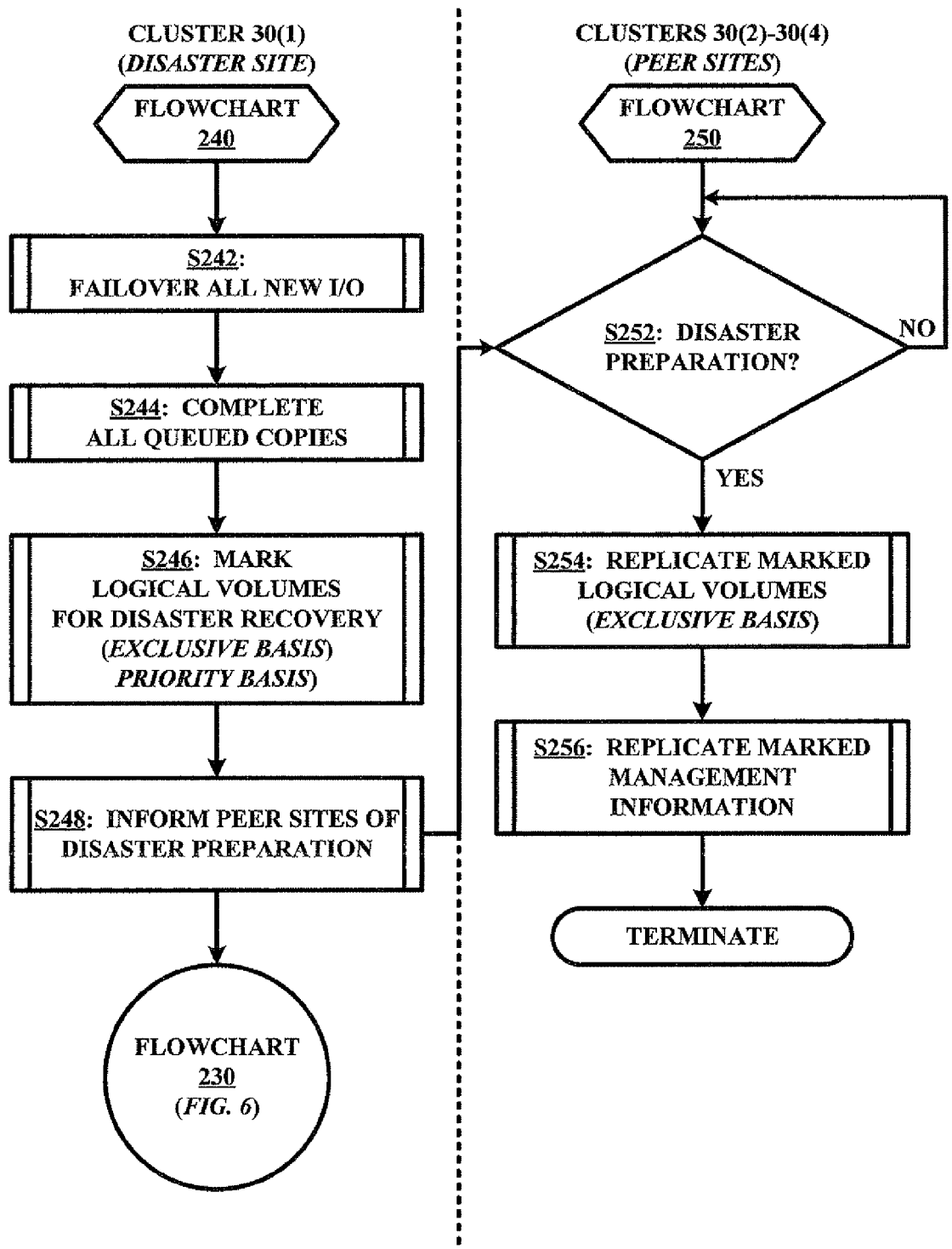

Referring to FIG. 5, in this example case, module 90(1) is in a multi-cluster grid as shown in FIG. 4 and would therefore proceed to a flowchart 240 as shown in FIG. 7. A stage S242 of flowchart 240 encompasses module 90(1) failovering all new I/O from hosts 10 and 11 to safe peer sites 30(2)-30(4), and a stage S244 of flowchart 240 encompasses module 90(1) completing all queue copies of cached data. Thereafter, during a stage S246 of flowchart 240, module 90(1) marks each logical volume (e.g., all cached data and all physical volumes) with a unique token for purposes of distinguishing the marked logical volumes from other logical volumes within the storage domain. This marking of logical volumes is accomplished on an exclusive basis to ensure only logical volumes being exclusively stored at disaster site 30(1) are replicated to the safe peer sites 30(2)-30(4) and on a priority basis to ensure the higher priority logical volumes will be replicated to safe peer sites 30(2)-30(4) before any lower priority logical volumes. For the priority basis, a priority of each logical volume may be pre-programmed in disaster site 30(1) prior to receiving the disaster preparation initiation or be inclusive of the disaster preparation intimation.

A stage S248 of flowchart 240 encompasses module 90(1) informing modules 90(2)-90(4) of the disaster preparation of disaster site 30(1) including a provision of the which logical volumes are marked. In response thereto, modules 90(2)-90(4) proceed from a passive stage S252 of flowchart 250 to replicate all of the marked logical volumes from disaster site 30(1) to peer sites 30(2)-30(4) on an exclusive basis in view of the copy policy settings of the storage domain. As a result, each marked logical volume will be operationally stored on only one of the safe peer sites 30(2)-30(4).

Upon completion of stage S248, module 90(1) executes stages S232-S236 of flowchart 230 as previously described herein in connection with FIG. 6. However, in view of being in a multi-cluster grid, stage S234 additionally encompasses module 90(1) offloading data location information to onsite removable media (i.e., information indicative of the location replicated logical volumes among peer sites 30(2)-30(40)) and marking all of the management information for disaster recovery (e.g., the data location information, the database data and the metadata). In response thereto, modules 90(2)-90(4) further replicates all of the marked management information of disaster site 30(1) during a stage S256 of flowchart 250. Thereafter, modules 90(2)-90(4) may place the offsite removable media storing the marked management information in the offsite I/O stations of safe peer sites 30(2)-30(4).

Referring to FIGS. 1-7, those having ordinary skill in the art will appreciate numerous benefits and advantages of the embodiments illustrated in FIGS. 1-7 including, but not limited to, a single point activated client tool that allows a client to prepare a storage system for a disaster at its onsite location in a manner that facilitates an expedient recovery on the onsite location to its pre-disaster state. Those having ordinary skill in the art will further appreciate how to apply the inventive principles of embodiments as illustrated in FIGS. 1-7 as related to more or less complex storage domains than the storage domain shown in FIG. 1, and to more or less complex storage systems than the virtual tape server system shown in FIG. 2.

Referring to FIGS. 1 and 2, in practice, each cluster 30 may include a processor and a memory for implementing one or more of its components (not shown for clarity purposes). The term "processor" as used herein is broadly defined as one or more processing units of any type for performing all arithmetic and logical operations and for decoding and executing all instructions related to facilitating an implementation by a cluster of the various methods of the present invention. Additionally, the term "memory" as used herein is broadly defined as encompassing all storage space within clusters 30 (e.g., computer readable mediums of any type).

Those having ordinary skill in the art may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A computer readable medium embodying a program of machine-readable instructions executable by a processor to perform operations for preparing the storage system of a pending disaster at an onsite location of the storage system, the operations comprising:

the storage system receiving a disaster preparation initiation from an offsite client; and in response to receiving the disaster preparation initiation from the offsite client, the storage system executing a disaster preparation of onsite data including at least one of:

managing a temporary storage of onsite data volumes to at least one peer site, managing a storage of onsite cached data to a first onsite removable media, and managing a storage of onsite management information to a second onsite removable media; and, wherein the managing of the temporary storage of onsite data volumes at the at least one peer site includes:

marking each logical volume exclusively stored within the storage system; and initiating a replication of each marked logical volume to the at least one peer site.

2. The computer readable medium of claim 1, wherein the receiving of the disaster preparation initiation from the offsite client includes:

providing a disaster preparation web page to the offsite client; and receiving the disaster preparation initiation based on the offsite client utilizing the web page to initiate the disaster preparation of the storage system.

3. The computer readable medium of claim 1, wherein the replicating of each marked logical volume to the at least one peer site is on at least one of an exclusive basis and a priority basis.

4. The computer readable medium of claim 1, wherein the onsite management information includes data location information indicative of a storage location of each replicated marked logical volume at the at least one peer site; and wherein the managing of the storage of the onsite management information to the second onsite removable media includes:

offloading the data location information to the second onsite removable media, and placing the second onsite removable media storage in an I/O station of the storage system.

5. A computer readable medium embodying a program of machine-readable instructions executable by a processor to perform operations for preparing the storage system of a pending disaster at an onsite location of the storage system, the operations comprising:

the storage system receiving a disaster preparation initiation from an offsite client; and in response to receiving the disaster preparation initiation from the offsite client, the storage system executing a disaster preparation of onsite data including at least one of:

managing a temporary storage of onsite data volumes to at least one peer site, managing a storage of onsite cached data to a first onsite removable media, and managing a storage of onsite management information to a second onsite removable media; and, wherein the onsite management information includes at least one of database data and metadata; and wherein the managing of the storage of the onsite management information to the second onsite removable media includes:

offloading the at least one of database data and the metadata to the second onsite removable media, and placing the second onsite removable media storage in an I/O station of the storage system.

6. The computer readable medium of claim 5, wherein the onsite management information further includes data location information indicative of a storage location of each onsite data volume at the at least one peer site.

7. A storage system, comprising:
a processor; and a memory storing instructions operable with the processor for preparing the storage system of a pending disaster at an onsite location of the storage system, the instructions executed for:

the storage system receiving a disaster preparation initiation from an offsite client; and in response to receiving the disaster preparation initiation from the offsite client, the storage system executing a disaster preparation of onsite data including at least one of:

managing a temporary storage of onsite data volumes to at least one peer site, managing a storage of onsite cached data to a first onsite removable media, and managing a storage of onsite management information to a second onsite removable media; and, wherein the managing of the temporary storage of onsite data volumes at the at least one peer site includes:

marking each logical volume exclusively stored within the storage system; and initiating a replication of each marked logical volume to the at least one peer site.

8. The storage system of claim 7, wherein the receiving of the disaster preparation initiation from the offsite client includes:

providing a disaster preparation web page to the offsite client; and receiving the disaster preparation initiation based on the offsite client utilizing the web page to initiate the disaster preparation of the storage system.

9. The storage system of claim 7, wherein the replicating of each marked logical volume to the at least one peer site is on at least one of an exclusive basis and a priority basis.

10. The storage system of claim 7, wherein the onsite management information includes data location information indicative of a storage location of each replicated marked logical volume at the at least one peer site; and wherein the managing of the storage of management information to the second onsite removable media includes:

offloading the data location information to the second onsite removable media, and placing the second onsite removable media storage in an I/O station of the storage system.

11. A storage system, comprising:
a processor; and a memory storing instructions operable with the processor for preparing the storage system of a pending disaster at an onsite location of the storage system, the instructions executed for:

the storage system receiving a disaster preparation initiation from an offsite client; and in response to receiving the disaster preparation initiation from the offsite client, the storage system executing a disaster preparation of onsite data including at least one of:

managing a temporary storage of onsite data volumes to at least one peer site, managing a storage of onsite cached data to a first onsite removable media, and managing a storage of onsite management information to a second onsite removable media; and, wherein the onsite management information includes at least one of database data and metadata; and wherein the managing of the storage of management information to the second onsite removable media includes:

offloading the at least one of database data and the metadata to the second onsite removable media, and placing the second onsite removable media storage in an I/O station of the storage system.

12. The storage system of claim 11, wherein the onsite management information further includes data location information indicative of a storage location of each onsite data volume at the at least one peer site.

13. A method for preparing the storage system of a pending disaster at an onsite location of the storage system, the method comprising:

the storage system receiving a disaster preparation initiation from an offsite client; and in response to receiving the disaster preparation initiation from the offsite client, the storage system executing a disaster preparation of onsite data including at least one of:

managing a temporary storage of onsite data volumes to at least one peer site, managing a storage of onsite cached data to a first onsite removable media, and managing a storage of onsite management information to a second onsite removable media; and, wherein the managing of the temporary storage of onsite data volumes at the at least one peer site includes:

marking each logical volume exclusively stored within the storage system; and initiating a replication of each marked logical volume to the at least one peer site.

14. The method of claim 13, wherein the receiving of the disaster preparation initiation from the offsite client includes:

providing a disaster preparation web page to the offsite client; and receiving the disaster preparation initiation based on the offsite client utilizing the web page to initiate the disaster preparation of the storage system.

15. The method of claim 13, wherein the replicating of each marked logical volume to the at least one peer site is on at least one of an exclusive basis and a priority basis.

16. The method of claim 13, wherein the onsite management information includes data location information indicative of a storage location of each replicated marked logical volume at the at least one peer site; and wherein the managing of the storage of management information to the second onsite removable media includes:

offloading the data location information to the second onsite removable media, and placing the second onsite removable media storage in an I/O station of the storage system.

17. A method for preparing the storage system of a pending disaster at an onsite location of the storage system, the method comprising:

the storage system receiving a disaster preparation initiation from an offsite client; and in response to receiving the disaster preparation initiation from the offsite client, the storage system executing a disaster preparation of onsite data including at least one of:

managing a temporary storage of onsite data volumes to at least one peer site, managing a storage of onsite cached data to a first onsite removable media, and managing a storage of onsite management information to a second onsite removable media; and, wherein the onsite management information includes at least one of database data and metadata; and wherein the managing of the storage of management information to the second onsite removable media includes:

offloading the at least one of database data and the metadata to the second onsite removable media, and placing the second onsite removable media storage in an I/O station of the storage system.

18. The method of claim 17, wherein the onsite management information further includes data location information indicative of a storage location of each onsite data volume at the at least one peer site.

* * * * *